Patented June 10, 1930

1,763,101

UNITED STATES PATENT OFFICE

ALFRED OBERLE, OF OAK PARK, ILLINOIS

CARBONACEOUS MATERIAL AND PROCESS OF MAKING THE SAME

No Drawing.   Application filed November 3, 1923.   Serial No. 672,648.

This invention relates to improvements in carbonaceous material and a process for making the same, and refers more particularly to the treatment of petroleum carbon resulting as a residue from treatment of petroleum oil in the form of carbon collecting during the destructive distillation or cracking of petroleum oils and carbon separated by the centrifuging and filtering of residual and light carbonaceous materials to produce activated carbon.

Among the salient objects of the invention are to provide a process in which carbonaceous material of this character is relieved of any volatile oils, or tarry and pitchy material, and treated by heat and pressure in the presence of water, mineral matter, and gaseous material introduced thereto whereby an activated carbon having high absorbing qualities results.

Petroleum coke or free carbon from the treating of hydrocarbon oil, carbon from filtering or centrifuging oil, residual or carbon precipitated from liquid or volatile hydrocarbons produced in the destructive distillation of oils, are materials particularly adapted to this process. They may be in a dry form of powder or coke or combined with other light hydrocarbons or impurities such as oils, tars, asphalts, waxes, pitches, sulphur and enumerable other materials which will, in the treatment of the carbon, necessitate varying the process somewhat in order that the impurities may be satisfactorily eliminated.

The carbonaceous material is introduced to a fire still and water added thereto. With this carbon and water mixture may be admixed sand, slacked or unslacked lime or other calcareous material such as oyster or clam shells, calcium carbonate or calcium chloride, magnesium carbonate, magnesium chloride, or any of the oxides included in the fifth group of Mendelejeff's table. A fire is started beneath the still and the temperature of the mixture increased not to exceed 1000° F., preferably temperatures of from 900° to 950° F. produce a more satisfactory treatment. It is understood, however, that the temperature range is not limited as different types of carbonaceous material will require different temperatures for treatment. During the heating, and while the carbonaceous material is being treated, the mixture is preferably kept in constant agitation by means of a mechanical mixer or agitator. Air, steam, carbon dioxide, or any other suitable gas or mixture of gases may be used by introduction at the bottom of still.

Pressure is built up upon the mixture during the heating operation, due to the evolution of vaporous and gaseous materials relieved by the distillation of the water and evolution of gas and volatile material from the carbonaceous substance treated. The vapors evolved are drawn off from the still and pressure ranging from 50 to 500 pounds maintained, a pressure of approximately 300 pounds having been found to yield especially good results in treatment of the material.

When practically all of the liquid and volatile matter is driven out the pressure is gradually released. The rapidity with which the pressure is released will govern, to a considerable extent, the character of the resultant material. If the carbonaceous material treated is in large lumps or pieces, and it is desired to break up, shatter or pulverize the material by suddenly reducing the pressure, the carbonaceous material will be broken into relatively fine state; while by releasing the pressure slowly, the pieces of carbonaceous material will remain substantially intact.

The function of combining water with the carbonaceous material is, one, to facilitate the building up of pressure, two, to give a better distribution of heat, three, to facilitate the distilling off of oils and other impurities, four, to prevent the coking and fusion of carbonaceous materials, five, to remove undesirable products formed during treatment.

When the liquid and volatile material has been removed from the mixture, and the pressure reduced, a vacuum is gradually built up on the still, the temperature being maintained relatively the same as with the pressure treatment, but not exceeding 1000° F. This vacuum treatment serves to exhaust more completely from the carbonaceous material any remaining liquid or volatile substance. With the completion of the vacuum treatment, the fire beneath the still is extinguished and gas gradually admitted thereto, such gases as air, flue gases, carbon monoxide, carbon dioxide, nitrogen, oxygen, chlorine, or mixtures of these gases being suitable. The gas is carefully introduced until a pressure is built up upon the material in the still. The gases are preferably introduced by means of perforated tubes along the bottom of the still. Care must be taken in the introduction of the gases that explosive combustion does not take place with the highly heated carbon.

A pressure is gradually built up by means of the gas which is admitted, and after the material has been treated for a sufficiently long period of time to completely inoculate or saturate the carbon with the gas, the excess gas is relieved from the still and recovered. This treatment with a gas of the character described, serves to more completely free the carbon of any impurities remaining therein.

Subsequent to the treatment with the gas, the activated carbonaceous material may be subjected to a treatment with a solution of hydrochloric acid, nitric acid, sulphuric acid, other mineral or vegetable acids or potassium chlorate, if necessary to further remove any remaining objectionable material contained in the carbon. In the place of the acids mentioned, the carbon may be treated with gasoline, benzole, carbon bisulphide, chloroform or other suitable hydrocarbon materials. The materials used in treating the carbonaceous matter are subsequently removed.

The product is a high-quality activated carbon which may be granulated or pulverized, and is particularly adapted for use as an absorption material, also for decoloring, deodorizing refining, or as a catalyst. When combined with certain other combustible material, it may be used as fuel or may be worked into a form having substantially the characteristics of lamp black.

This material is a high-grade activated carbon and may be used for the following purposes: The refining of sugar, water purification, in the treatment of casinghead gas, in the refining and treatment of petroleum and its products, such as heavy lubricating oils, and medicinal oils, in making gas masks, in the treatment of edible oils, organic liquids and mineral acids. It is also adapted to the treatment of waxes, glycerine, gelatine, glue, and may be used as a catalyst or a filler.

During the treatment of the carbonaceous material with the gas, subsequent to imposing a vacuum upon the material, it is essential that the temperature of the mass be maintained below the coke-forming point so as not to destroy its desirable properties as an activated carbon. By means of this process, an inactive carbon is converted to an active state at a relatively low expense.

With some carbonaceous material, the treatment as above outlined is preceded by vacuum distillation.

I claim as my invention:

1. A process for producing activated carbon from carbonaceous material, comprising heating the material in the presence of water to a temperature sufficient to vaporize the water and volatile impurities, distilling off the evolved vapors under pressure, and subsequently reducing the pressure and imposing a vacuum on the material while continuing the heat treatment, thereby effecting a further removal of volatile substances.

2. A process for producing activated carbon from carbonaceous material, comprising heating the material in the presence of water to a temperature sufficient to vaporize the water and volatile impurities, distilling off the evolved vapors under pressure, subsequently reducing the pressure and imposing a vacuum on the material while continuing the heat treatment, and passing a gas under pressure through the material to effect a further removal of impurities.

3. A process for producing activated carbon from carbonaceous material, comprising heating the material in the presence of water to a temperature sufficient to vaporize the water and volatile impurities, distilling off the evolved vapors under pressure, subsequently reducing the pressure and imposing a vacuum on the material while continuing the heat treatment, and passing an oxidizing gas under pressure through the material during cooling to effect a further removal of impurities.

4. A process for producing activated carbon from carbonaceous material, comprising heating the material in the presence of water and calcareous material to a temperature sufficient to vaporize the water and volatile impurities, distilling off the evolved vapors under pressure, and subsequently reducing the pressure and imposing a vacuum on the material while continuing the heat treatment, thereby effecting a further removal of volatile substances.

5. A process for producing activated carbon from carbonaceous material, comprising heating the material in the presence of water to a temperature sufficient to vaporize the water and volatile impurities, distilling off the evolved vapors under pressure, agitating the mixture during the distilling operation, and subsequently reducing the pressure and imposing a vacuum on the material while continuing the heat treatment, thereby effecting a further removal of volatile substances.

6. A process such as that described in claim 2, including the treatment of end products with a mineral acid and separating the acid, gaseous liquid and solid impurities from the end product.

ALFRED OBERLE.